United States Patent
Ma et al.

(10) Patent No.: US 9,250,465 B2
(45) Date of Patent: Feb. 2, 2016

(54) ARRAY SUBSTRATE, TOUCH LIQUID CRYSTAL DISPLAY PANEL AND MANUFACTURING METHOD THEREOF

(71) Applicants: Shanghai Tianma Micro-Electronics Co., Ltd., Shanghai (CN); Tianma Micro-Electronics Co., Ltd., Shenzhen (CN)

(72) Inventors: Jun Ma, Shanghai (CN); Qijun Yao, Shanghai (CN); Lijun Zhao, Shanghai (CN)

(73) Assignees: Shanghai Tianma Micro-Electronics Co., Ltd., Shanghai (CN); Tianma Micro-Electronics Co., Ltd., Shenzhen (CN)

( * ) Notice: Subject to any disclaimer, the term of this patent is extended or adjusted under 35 U.S.C. 154(b) by 0 days.

(21) Appl. No.: 14/085,745

(22) Filed: Nov. 20, 2013

(65) Prior Publication Data
US 2014/0333849 A1    Nov. 13, 2014

(30) Foreign Application Priority Data

May 13, 2013    (CN) .......................... 2013 1 0175657

(51) Int. Cl.
| | | |
|---|---|---|
| G02F 1/1333 | (2006.01) | |
| G02F 1/1343 | (2006.01) | |
| G06F 3/041 | (2006.01) | |
| G06F 3/044 | (2006.01) | |
| G02F 1/1362 | (2006.01) | |

(52) U.S. Cl.
CPC .......... *G02F 1/13338* (2013.01); *G02F 1/1333* (2013.01); *G02F 1/134363* (2013.01); *G06F 3/044* (2013.01); *G06F 3/0412* (2013.01); *G02F 2001/13629* (2013.01); *G02F 2001/134372* (2013.01); *G02F 2201/121* (2013.01); *G06F 2203/04103* (2013.01)

(58) Field of Classification Search
CPC .......... G02F 1/13338; G02F 1/134363; G02F 2001/13629; G02F 1/1333; G02F 2001/134372; G02F 2201/121; G06F 3/0412; G06F 3/044; G06F 2203/04103
USPC ........... 349/12, 139, 141, 143, 147, 148, 187; 345/173, 174
See application file for complete search history.

(56) References Cited

U.S. PATENT DOCUMENTS

| 2001/0019375 A1* | 9/2001 | Kwon et al. .................... 349/43 |
|---|---|---|
| 2002/0101557 A1* | 8/2002 | Ono et al. .................... 349/143 |

(Continued)

FOREIGN PATENT DOCUMENTS

EP    2 743 752 A1    8/2013

OTHER PUBLICATIONS

European Search Report (ESR) as issued by the European Patent Office, dated Oct. 15, 2014.

*Primary Examiner* — Dung Nguyen
*Assistant Examiner* — Tai Duong
(74) *Attorney, Agent, or Firm* — Alston & Bird LLP

(57) ABSTRACT

An array substrate includes a plurality of pixel units, each of the pixel units includes a pixel electrode and a common electrode that are insulated from each other, and a conductive layer that is electrically connected in parallel to the common electrode. A double-layer metal layer is deposited on the common electrode at an opaque region of the pixel electrode to form a ring structure around a transparent region of the pixel electrode, thus reducing the resistances of the common electrodes. The ring structure can be U-shaped, half-ring shaped, or full-ring shaped.

5 Claims, 5 Drawing Sheets

(56) References Cited

U.S. PATENT DOCUMENTS

| | | | |
|---|---|---|---|
| 2004/0114083 A1* | 6/2004 | Do | 349/141 |
| 2005/0200791 A1* | 9/2005 | Ahn | 349/141 |
| 2011/0175096 A1* | 7/2011 | Gotoh et al. | 257/59 |
| 2012/0268396 A1 | 10/2012 | Kim et al. | |
| 2012/0327353 A1 | 12/2012 | Doi et al. | |
| 2013/0082977 A1* | 4/2013 | Noguchi et al. | 345/174 |

* cited by examiner

ARRAY SUBSTRATE, TOUCH LIQUID CRYSTAL DISPLAY PANEL AND MANUFACTURING METHOD THEREOF

CROSS-REFERENCES TO RELATED APPLICATIONS

This application claims the benefit of priority to Chinese Patent Application No. 201310175657.7, filed with the Chinese Intellectual Property Office on May 13, 2013, entitled "ARRAY SUBSTRATE, TOUCH LIQUID CRYSTAL DISPLAY PANEL AND MANUFACTURING METHOD THEREOF", the contents of which is incorporated herein by reference in its entirety.

TECHNICAL FIELD

The present invention refers to touch screen technology, and in particular to an array substrate, a touch liquid crystal display panel having reduced resistance of common electrodes and a manufacturing method thereof.

BACKGROUND OF THE INVENTION

At present, in the Thin Film Transistor-Liquid Crystal Display (TFT-LCD) field, a large-scale LCD panel is developing quickly with continuous updating of technologies. A Touch Panel (TP), as an input medium, is integrated with a display screen to form a touch display screen which plays an important role in the display field. Particularly, a capacitance touch panel is popular because of high sensitivity thereof. A mutual capacitance touch panel is commonly employed because of its advantages, such as high sensitivity and multi-touch detection capability.

At present, according to combination methods of the touch panel and an LCD device, there are two kinds of the touch panels, i.e., an on-cell touch panel and an in-cell touch panel. The on-cell touch panel and the display device are manufactured separately and then are assembled together. In this way, the thickness of the display screen will be increased. In addition, the transmittance and the contrast of the display will be reduced because multiple layers of transparent glasses or thin films are provided additionally. Further, the manufacturing cost is high with this method. Therefore, current research focuses on in-cell touch panel technology which integrates the TP into a touch liquid crystal display Panel (LCD Panel) because of its low production cost, high transmittance, and thin thickness, etc.

In a mutual capacitance touch panel, X-direction coordinates of touch points are determined by touch driving electrodes, and Y-direction coordinates of the touch points are determined by touch sensing electrodes. A touch driving voltage is applied to the touch driving electrodes. A constant voltage is applied to the touch sensing electrodes. For detecting a touch point, a progressive scanning is performed on the X-direction touch driving electrodes. When each row of the touch driving electrodes is scanned, the signal on each column of the touch sensing electrodes is read. Intersections of each row and each column can be scanned through a round of full-screen scanning to obtain X*Y signals. The coordinates of multiple touch points can be determined with this touch location detection method, and thereby the multi-touch detection can be realized.

FIG. 1 shows an equivalent circuit of a mutual capacitance touch panel, which includes a signal source 101, a touch driving electrode resistance 103, a mutual capacitance 102 between the touch driving electrode and the touch sensing electrode, a parasitic capacitance 104 between the touch driving electrode and a common electrode or between the touch sensing electrode and a common electrode, a touch sensing electrode resistance 105, and a touch point detection circuit 106. A part of the current of the circuit flows into a touch object (e.g., a finger) when the touch panel is touched by the touch object, resulting in a change of the value of the mutual capacitance 102 between the touch driving electrode and the touch sensing electrode. The touch point detection circuit converts the weak current changes caused by the mutual capacitance 102 into a output voltage signal Vout.

The touch driving electrode and the touch sensing electrode are both disposed on the LCD panel, and the distance between the TP and the common electrode of the LCD panel is very short. Thus, the parasitic capacitance 104 between the touch driving electrode and a common electrode or between the touch sensing electrode and the common electrode is very large, such that the TP is affected greatly by noises generated by the LCD panel. In this case, current signals detected by the touch point detection circuit are difficult to be detected due to the noises, and thus touch resolution is poor, as a consequence, the touch panel may not operate accurately.

In addition, considering conventional touch display panels, a signal current is small and easy to flow from the driving electrode to the sensing electrode when the touch signal strength is weak. Thus, a signal delay exists between a peripheral side and the center of the common electrode, which will cause the signal at the center of the TP to be weaker than that at each of the four sides thereof. In this case, the signal detection of the TP is affected, and there is a problem that the touch signal will not be detected.

BRIEF SUMMARY OF THE INVENTION

Embodiments of the present invention provide an array substrate, a touch liquid crystal display panel, and a manufacturing method of the array substrate, which reduce resistances of common electrodes, thereby solving the problem of unreliable or no response to a touch signal (i.e. the touch signal cannot be reliably detected) occurring at the center of the touch panel.

Embodiments of the present invention provide an array substrate that can solve the above technical problems. The array substrate includes: a plurality of pixel units, each of the pixel units including a pixel electrode and a common electrode insulated from each other. The array substrate further includes a conductive layer which is connected in parallel to the common electrodes. In a specific embodiment, the conductive layer is adapted to reduce the resistance of the common electrode.

Embodiments of the present invention provide a touch liquid crystal display panel. The touch liquid crystal display includes a first substrate, a second substrate opposite to the first substrate, and a liquid crystal layer disposed between the first substrate and the second substrate. In an embodiment, the first substrate is an array substrate, and the second substrate is a color film substrate.

Embodiments of the present invention provide a manufacturing method of the array substrate. The manufacturing method includes providing a substrate; disposing a gate electrode on the substrate; disposing a gate insulating layer on the gate electrode; forming source/drain electrodes, pixel electrodes and common electrodes; and disposing on the common electrodes a conductive layer. The conductive layer and the common electrodes are connected in parallel to each other.

BRIEF DESCRIPTION OF THE DRAWINGS

The embodiments will be described more fully hereinafter with reference to the accompanying drawings, in which exemplary embodiments of the invention are shown. As those skilled in the art would realize, the described embodiments may be modified in various different ways without departing from the spirit or scope of the embodiments. Like reference numerals designate like elements throughout the specification.

DETAILED DESCRIPTION OF THE PREFERRED EMBODIMENTS

Technical solutions and advantages of the disclosure, the technical solutions in the embodiments of the disclosure will be described clearly and completely in conjunction with the drawings in the embodiments of the disclosure hereinafter. Apparently, the described embodiments are only some of but not all the embodiments of the present invention. All the other embodiments obtained by those skilled in the art based on the embodiment in the present disclosure without inventive efforts will fall within the scope of protection of the present disclosure.

Figure 1:
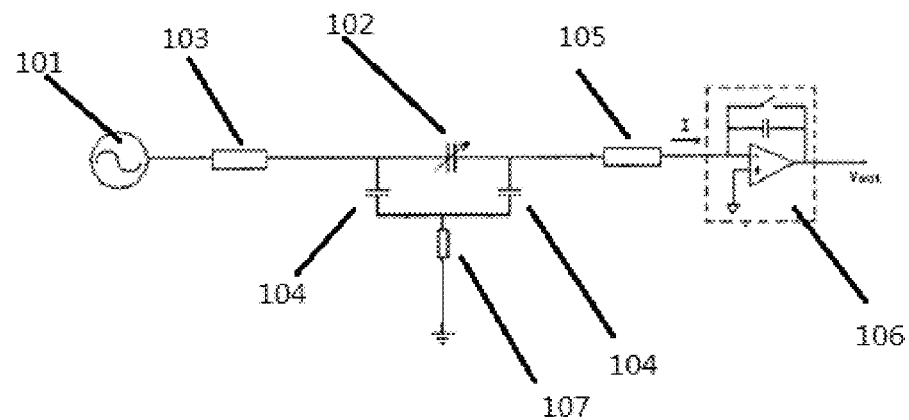
FIG. 1 is a signal equivalent circuit diagram of an existing touch panel circuit in the prior art.
Figure 2:
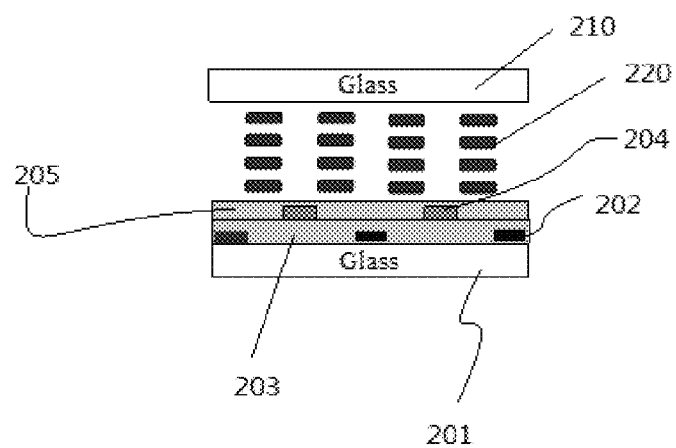
FIG. 2 is a cross-sectional view of a layer structure when a touch liquid crystal display panel is an IPS display panel in the prior art.

The embodiments of the present invention will be described in combination with the figures. FIG. 2 is a cross-sectional view of a layer structure when a touch liquid crystal display panel is an In-Plane Switching (IPS) display panel in the prior art. The touch liquid crystal display panel includes: a first substrate 200 including a glass substrate 201, pixel electrodes 202, a first insulating layer 203, common electrodes 204 and a second insulating layer 205; a second substrate 210; and liquid crystal 220 sandwiched between the first substrate 200 and the second substrate 210. The first substrate is an array substrate and the second substrate is a color film substrate.

It should be noted that, a normal array substrate includes: a substrate; and a gate electrode, a gate insulating layer, a polysilicon layer, a source electrode and a drain electrode, data lines, pixel electrodes and common electrodes all of which are disposed on the substrate in sequence. In the application, a complete structure drawing of the array substrate is not given for convenience of the description.

Figure 3:
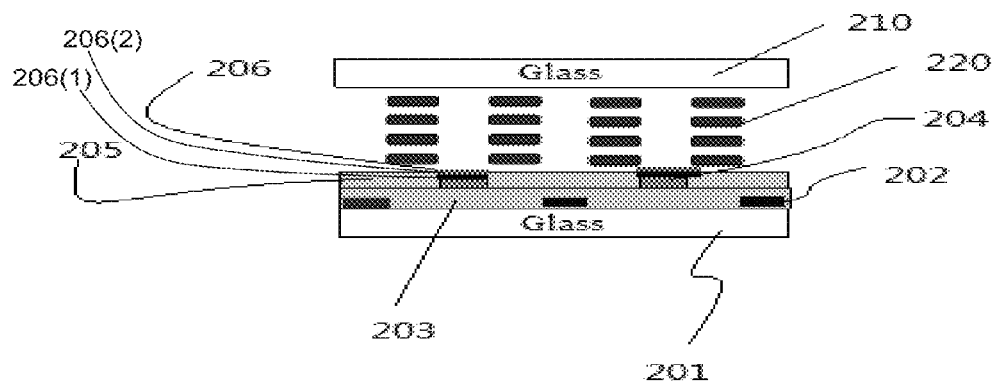
FIG. 3 is a cross-sectional view of a layer structure when a touch liquid crystal display panel is an IPS display panel according to an embodiment of the present invention.

Referring to FIG. 3, FIG. 3 is a cross-sectional view of a layer structure when a touch liquid crystal display panel is an IPS display panel in one embodiment of the present invention. An array substrate includes: pixel electrodes 202, common electrodes 204, and a first insulating layer 203 disposed between the pixel electrode 202 and the common electrode 204 to electrically separate the pixel electrodes 202 and the common electrodes 204. In an embodiment of the present invention, a conductive layer 206 is further deposited on the common electrodes 204 to reduce the resistance of the common electrodes 204. At the same time, in the embodiment of the present invention, the conductive layer 206 is deposited on the common electrodes 204 at an opaque region of the pixel electrode 202 to avoid the reduction of an aperture ratio of the pixel electrode. In an embodiment, the conductive layer is deposited on the outmost common electrode on the array substrate to form a ring structure around a transparent region of the pixel electrode. In another embodiment, the conductive layer may be a U shape structure, or may be a half ring structure, or a whole ring structure. The conductive layer 206 shown in FIG. 3 is illustrative only and should not be taken as limitations. Optionally, the conductive layer may be deposited on the common electrodes at the opaque region of the pixel electrode 202 to avoid the reduction of the aperture ratio of the pixel electrodes.

Because the conductive layer is deposited on the common electrodes 204 at the opaque regions of the pixel electrodes 202, an equivalent resistance of the conductive layer is connected in parallel with the resistances of the common electrodes, and thereby the resistances of the common electrodes can be reduced effectively. In this way, the problem of poor touch (i.e. the touch signal cannot be detected) at center of a touch panel due to a large resistance of the common electrode is solved.

In addition, it is to be noted that in an alternative embodiment, a transparent conductive layer, such as ITO layer, may be deposited on the common electrode at the transparent region of the pixel electrodes to achieve the advantages of reducing the resistance of the common electrode and avoiding the great reduction of the aperture ratio of the pixel electrodes. Of course, there are also some bad effects on the aperture ratio of the pixel electrodes in the case that the transparent conductive layer is deposited on the common electrode in the transparent region of the pixel electrode. Therefore, in an optimal embodiment, the conductive layer is deposited on the common electrode in the opaque region of the pixel electrode.

The conductive layer deposited on the common electrode can be a transparent conductive layer or an opaque conductive layer. Particularly, the opaque conductive layer is deposited on the common electrodes at the opaque region of the pixel electrode and may be used as shading stripes, thus improving the luminance of backlight further. In another embodiment, the conductive layer deposited on the common electrode in the opaque region of the pixel electrode is a double metal layer structure. Optionally, the double metal layer has a Mo/AlNd double metal layer structure. As shown in FIG. 3, the conductive layer 206 includes a first layer 206(1) and a second layer 206(2). The laminating sequence of the double-metal layer structure of Mo and AlNd can be interchanged.

Figure 4:
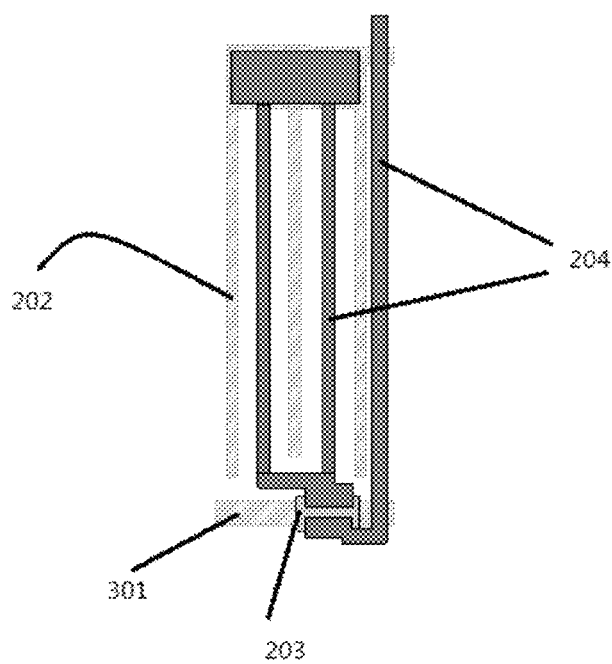
FIG. 4 is a top view of electrodes when a touch liquid crystal display panel is an IPS display panel in the prior art.
Figure 5:
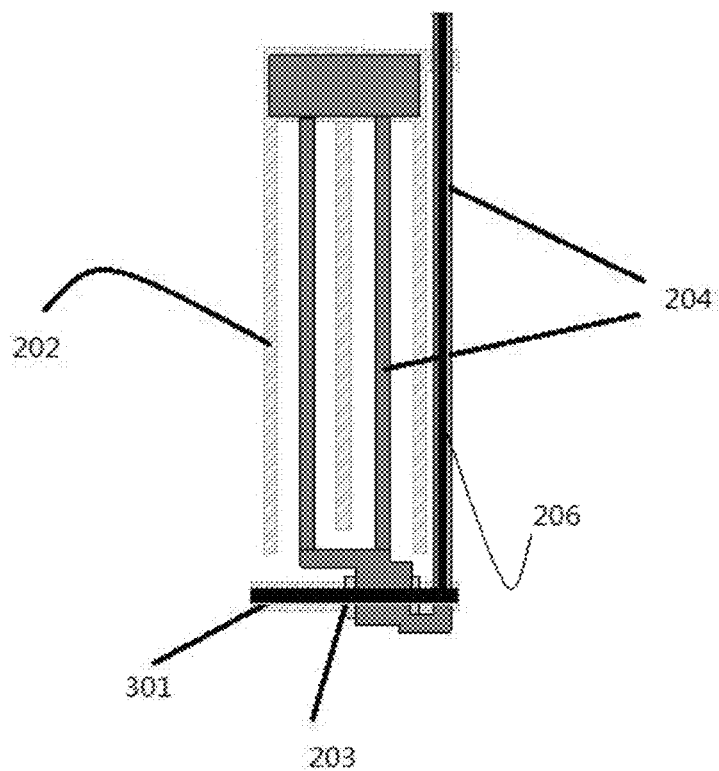
FIG. 5 is a top view of electrodes according to the embodiment of FIG. 3.
Figure 6:
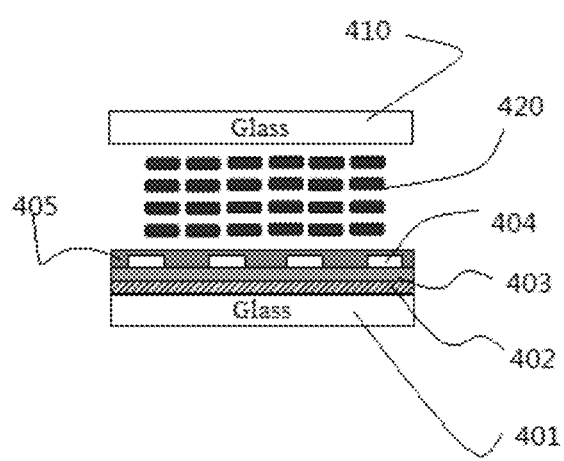
FIG. 6 is a cross-sectional view of a layer structure when a touch liquid crystal display panel is an FFS display panel in the prior art.

Referring to FIG. 4 and FIG. 5, FIG. 4 is a top view of electrodes of the array substrate of an IPS touch liquid crystal display panel in the prior art, where common electrodes 204 are deposited on pixel electrodes 202 through a first insulating layer 203, and the pixel electrodes 202 are disposed on a gate line 301. FIG. 5 is a top view of electrodes of the IPS touch liquid crystal display panel according to an embodiment of the present invention. In the embodiment, a common electrode 204 is disposed above a pixel electrode 202 through a first insulating layer 203, a conductive layer 206 is deposited on the common electrode overlapping with the data line spatially. Namely, the conductive layer 206 is deposited on the rightmost vertical stripe in FIG. 5. It is to be noted that FIG.

5 is just shown for convenient explanation but should not be taken as limitations. In principle, the conductive layer 206 is deposited on the common electrodes at the opaque region of the pixel electrode and is connected in parallel to the common electrodes to reduce the resistance of the common electrode.

Referring to FIG. 6 through FIG. 9, FIG. 6 is a cross-sectional view of a layer structure of an Fringe Field Switching (FFS) touch liquid crystal display panel in the prior art. The touch liquid crystal display panel includes: a first substrate including a substrate 401, pixel electrodes 402, a first insulating layer 403, common electrodes 404 and a second insulating layer 405; a second substrate 410; and liquid crystal 420 sandwiched between the first substrate and the second substrate 410. The pixel electrodes 402 are a whole plate structure. The common electrodes 404 are comb-shape and overlapping with the pixel electrodes 402. The first insulating layer 403 is disposed between the pixel electrodes 402 and the common electrodes 404 to cut off the electric connection therebetween.

Figure 7:
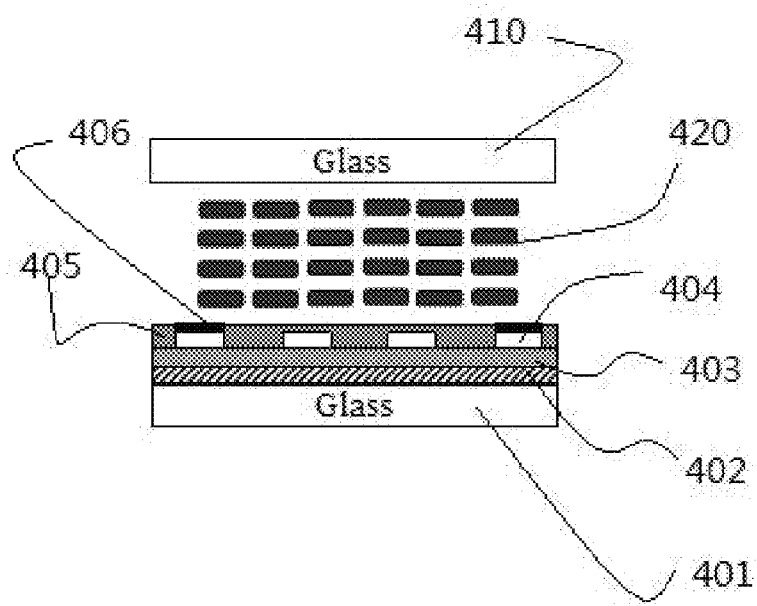
FIG. 7 is a cross-sectional view of a layer structure when a touch liquid crystal display panel is an FFS display panel according to an embodiment of the present invention.

FIG. 7 is a cross-sectional view of a layer structure of an FFS touch liquid crystal display panel according to an embodiment of the present invention. The first substrate includes: pixel electrodes 402, common electrodes 404 and a conductive layer 406 deposited on the common electrodes 404. The conductive layer 406 is connected in parallel with the common electrodes 404 to reduce the resistances of the common electrodes 404. In addition, the conductive layer 406 is deposited on the common electrodes at an opaque region of the pixel electrode 402 to avoid the reduction of the aperture ratio of the pixel electrodes 402 in the embodiment. Optionally, the conductive layer is deposited on the outmost common electrode on an array substrate to form a ring structure around the transparent region of the pixel electrode. Namely, the ring structure is deposited around the transparent region of the pixel electrode, and the ring structure is still disposed at the opaque region of the pixel electrode. The ring structure may be U shape, a half ring or a whole ring. The conductive layer 406 shown in FIG. 7 is just for convenience of explanation, which should not limit the scope of the invention. Optionally, the conductive layer is deposited on the common electrodes at the opaque region of the pixel electrode 402 to avoid the reduction of the aperture ratio of the pixel electrodes. In an embodiment, the conductive layer 406 may be a transparent conductive layer or an opaque conductive layer. In the case that conductive layer is made of transparent conductive materials such as ITO, the conductive layer 406 may be provided at the transparent region of the pixel electrode when the demand for the aperture ratio is not high. In the case that conductive layer is made of opaque conductive materials, the conductive layer can only be deposited on the common electrode at the opaque region of the pixel electrode.

It is to be noted that, the conductive layer may be used as a shading stripe when the conductive layer made of the opaque conductive materials is deposited on the common electrode at the opaque region of the pixel electrode. In this way, the resistances are reduced and the luminance of backlight is improved.

Figure 8:
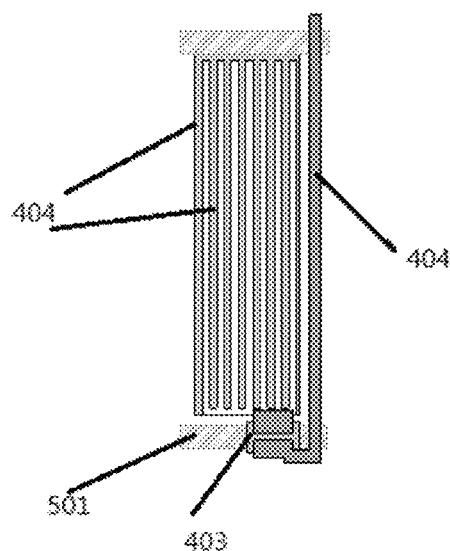
FIG. 8 is a top view of electrodes when a touch liquid crystal display panel is an FFS display panel in the prior art.
Figure 9:
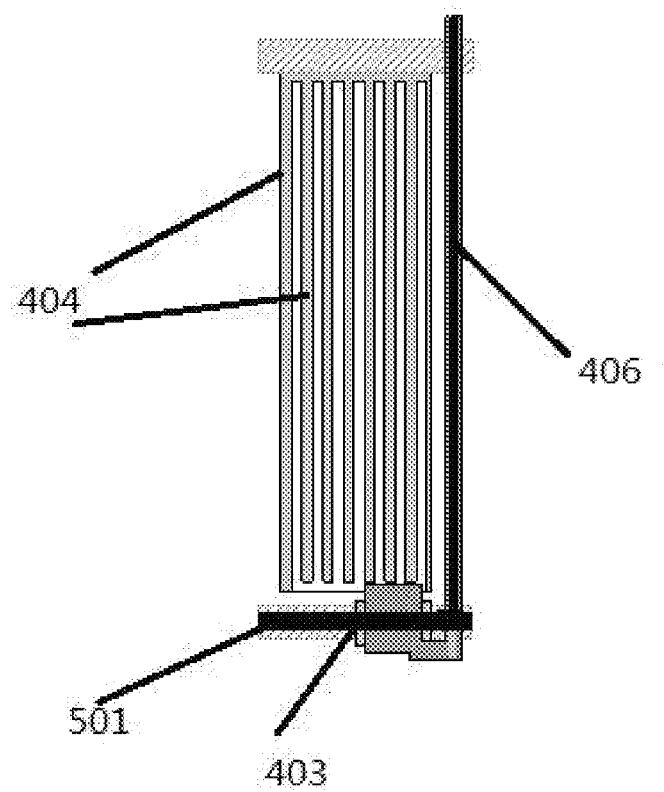
FIG. 9 is a top view of electrodes of the embodiment of FIG. 7.

FIG. 8 is a top view of electrodes when a touch liquid crystal display panel is an FFS display panel in the prior art, and FIG. 9 is a top view of electrodes according to an embodiment of the present invention. Referring to FIG. 8 and FIG. 9, the common electrodes 404 are arranged in a comb-shaped structure. The pixel electrodes are disposed under the common electrodes to form a whole plate (not shown in the Figure). The common electrode 404 is laminated with the pixel electrode via a first insulating layer 403. The gate line 501 is disposed under the pixel electrode. The data line (not shown in the figure) is perpendicular to the gate line 501 and is in parallel with the common electrode 404. As shown in FIG. 9, the conductive layer 406 is deposited on the common electrode 404 at the opaque region of the pixel electrode. Optionally, the conductive layer 406 forms a ring structure around the transparent region of the pixel electrode. Optionally, the conductive layer is a composite metal structure, and preferably the conductive layer may have a Mo/AlNd double-layer structure (not shown).

The following advantages or beneficial effects are provided according to the embodiments of the present invention:

In the embodiments of the present invention, a metal layer with the double-layer structure is deposited on the common electrode at the opaque region of the pixel electrode to form the ring structure around the pixel electrode. In this way, the resistance of the common electrode is reduced, the problem that the touch signal can't be detected at the center of the touch panel is solved, and the sensitivity of the touch panel is improved. Furthermore, the conductive layer can be used as a shading stripe when the conductive layer is made of opaque materials and deposited on the common electrode at the opaque region of the pixel electrode, thus improving and the luminance of backlight.

The present invention is not limited to the above-mentioned embodiments, but the invention can also be enforced in other various modified embodiments. It should therefore be appreciated that variations may be made in these embodiments by those skilled in the art without departing from the scope of the present invention as defined by the following claims.

What is claimed is:

1. An array substrate, comprising: a plurality of pixel units, wherein each of the pixel units comprises a pixel electrode, a common electrode insulated from the pixel electrode, wherein the common electrode is above the pixel electrode through an insulating layer, and a conductive layer electrically connected in parallel to the common electrode, wherein the conductive layer is on the common electrode at a transparent region, and the conductive layer is a transparent conductive layer.

2. A touch liquid crystal display panel, comprising a first substrate, a second substrate, and a liquid crystal layer disposed between the first substrate and the second substrate,
   wherein the first substrate is an array substrate comprising a plurality of pixel units, each of the pixel units comprises a pixel electrode, a common electrode insulated from the pixel electrode, wherein the common electrode is above the pixel electrode through an insulating layer, and a conductive layer electrically connected in parallel to the common electrode, wherein the conductive layer is on the common electrode at a transparent region, and the conductive layer is a transparent conductive layer; and
   wherein the second substrate is a color film substrate.

3. The touch liquid crystal display panel according to claim 1, wherein the touch liquid crystal display panel is an In-Plane Switching display panel.

4. The touch liquid crystal display panel according to claim 1, wherein the touch liquid crystal display panel is a Fringe Field Switching display panel.

5. A manufacturing method of an array substrate, comprising:
   providing a substrate;
   disposing a gate electrode on the substrate;
   disposing a gate insulating layer on the gate electrode;
   disposing a source electrode, a drain electrode, a pixel electrode and a common electrode on the gate insulating layer, wherein the common electrode is deposited on the pixel electrode through a first insulating layer;

depositing a conductive layer on the common electrode at a transparent region, wherein the conductive layer is electrically connected in parallel to the common electrode, and the conductive layer is a transparent conductive layer.

* * * * *